(12) United States Patent
Sim et al.

(10) Patent No.: US 12,363,279 B2
(45) Date of Patent: Jul. 15, 2025

(54) METHOD FOR PREDICTING QUANTIZATION PARAMETER USED IN A VIDEO ENCODING/DECODING APPARATUS

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Dong Gyu Sim, Seoul (KR); Han Sol Choi, Dongducheon-si (KR); Joo Hyung Byeon, Seoul (KR); Seung Wook Park, Yongin-si (KR); Wha Pyeong Lim, Hwaseong-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 77 days.

(21) Appl. No.: 18/019,342

(22) PCT Filed: Aug. 4, 2021

(86) PCT No.: PCT/KR2021/010227
§ 371 (c)(1),
(2) Date: Feb. 2, 2023

(87) PCT Pub. No.: WO2022/031003
PCT Pub. Date: Feb. 10, 2022

(65) Prior Publication Data
US 2023/0283768 A1 Sep. 7, 2023

(30) Foreign Application Priority Data

Aug. 4, 2020 (KR) .................. 10-2020-0097612
Aug. 3, 2021 (KR) .................. 10-2021-0102128

(51) Int. Cl.
*H04N 19/105* (2014.01)
*H04N 19/176* (2014.01)

(52) U.S. Cl.
CPC ......... *H04N 19/105* (2014.11); *H04N 19/176* (2014.11)

(58) Field of Classification Search
CPC .. H04N 19/105; H04N 19/176; H04N 19/139; H04N 19/46; H04N 19/124
See application file for complete search history.

(56) References Cited

U.S. PATENT DOCUMENTS 9,066,098 B2   6/2015   Sim et al.
9,235,774 B2   1/2016   Lu et al.
(Continued)

FOREIGN PATENT DOCUMENTS

CN   106464881 B   *   7/2019   ............. H04N 19/00
KR   101979816 B1       5/2019
(Continued)

OTHER PUBLICATIONS

International Search Report and Written Opinion cited in corresponding international application No. PCT/KR2021/010227; Nov. 10, 2021; 5 pp.

*Primary Examiner* — Dramos Kalapodas
(74) *Attorney, Agent, or Firm* — Lempia Summerfield Katz LLC

(57) ABSTRACT

Disclosed are a method and an apparatus for generating quantization parameters for generating a predicted quantization parameter for a quantization group using quantization parameters of a frame encoded/decoded previously in time.

(Continued)

The method and the apparatus may achieve an effect of improving prediction performance for the quantization parameter.

16 Claims, 12 Drawing Sheets

(56) References Cited

U.S. PATENT DOCUMENTS

| | | | |
|---|---|---|---|
| 9,749,631 B2 | 8/2017 | Lu et al. | |
| 10,142,642 B2 * | 11/2018 | Zhang | H04N 19/44 |
| 10,334,247 B2 | 6/2019 | Lu et al. | |
| 10,547,840 B2 | 1/2020 | Lu et al. | |
| 10,742,981 B2 | 8/2020 | Lu et al. | |
| 11,381,818 B2 * | 7/2022 | Lu | H04N 19/61 |
| 11,438,614 B2 * | 9/2022 | Yang | H04N 19/176 |
| 2013/0077871 A1 | 3/2013 | Lu et al. | |
| 2014/0321538 A1 * | 10/2014 | Sato | H04N 19/119 375/240.03 |
| 2015/0117522 A1 | 4/2015 | Sim et al. | |
| 2016/0105673 A1 | 4/2016 | Lu et al. | |
| 2017/0318292 A1 | 11/2017 | Lu et al. | |
| 2019/0306536 A1 * | 10/2019 | Lim | H04N 19/146 |
| 2019/0335176 A1 | 10/2019 | Lu et al. | |
| 2020/0154106 A1 | 5/2020 | Lu et al. | |
| 2020/0329251 A1 | 10/2020 | Yang et al. | |
| 2020/0336747 A1 | 10/2020 | Seo | |
| 2020/0396456 A1 | 12/2020 | Lu et al. | |
| 2021/0227221 A1 * | 7/2021 | Lim | H04N 19/70 |
| 2021/0235101 A1 | 7/2021 | Sim et al. | |
| 2022/0224928 A1 | 7/2022 | Yang et al. | |
| 2022/0224929 A1 | 7/2022 | Yang et al. | |
| 2022/0224930 A1 | 7/2022 | Yang et al. | |
| 2022/0224931 A1 | 7/2022 | Yang et al. | |
| 2022/0337838 A1 | 10/2022 | Lu et al. | |

FOREIGN PATENT DOCUMENTS

| | | |
|---|---|---|
| KR | 20190140422 A | 12/2019 |
| KR | 20200032681 A | 3/2020 |
| KR | 20200035158 A | 4/2020 |
| KR | 20200058546 A | 5/2020 |

* cited by examiner $QP\_x = QP1 \times w_1 + QP2 \times w_2 + QP4 \times w_4 + QP6 \times w_6 + QP7 \times w_7$

METHOD FOR PREDICTING QUANTIZATION PARAMETER USED IN A VIDEO ENCODING/DECODING APPARATUS

CROSS-REFERENCE TO RELATED APPLICATIONS

This application is a U.S. national stage of International Application No. PCT/KR2021/010227, filed on Aug. 4, 2021, which claims priority to Korean Patent Application No. 10-2020-0097612 filed on Aug. 4, 2020, and Korean Patent Application No. 10-2021-0102128 filed on Aug. 3, 2021, the entire disclosures of which are incorporated herein by reference.

TECHNICAL FIELD

The present disclosure relates to encoding and decoding of images (videos). More particularly, in a video encoding/decoding method, the present disclosure relates to a method and an apparatus for generating quantization parameters for generating a predicted quantization parameter for a quantization group using quantization parameters of a frame encoded/decoded previously in time. The method and the apparatus may improve prediction performance for the quantization parameter.

BACKGROUND

The descriptions below provide only the background information related to the present disclosure and do not constitute the prior art.

Since video data has a large amount of data compared to audio or still image data, it requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher encoding efficiency and an improved image enhancement effect than existing compression techniques is required.

On the other hand, a video encoding/decoding apparatus uses a predicted quantization parameter in units of quantization groups to generate a quantization parameter. Therefore, in video encoding/decoding, an effective method for generating predicted quantization parameters needs to be considered to improve encoding efficiency.

SUMMARY

In an image encoding/decoding method, an object of the present disclosure is to provide a method and an apparatus for generating quantization parameters for generating a predicted quantization parameter (QP) for a quantization group using quantization parameters of a frame encoded/decoded previously in time. The method and the apparatus may improve prediction performance for the quantization parameter.

One aspect of the present disclosure provides a method for generating a quantization parameter for a current block included in a current picture. The method is performed by a video decoding apparatus. The method comprises decoding prediction information on the current block and a delta quantization parameter from a bitstream. The method also comprises determining at least one pre-decoded reference region using the prediction information. The method also comprises calculating a predicted quantization parameter using quantization parameters corresponding to the at least one reference region. The method also comprises generating the quantization parameter for the current block by adding the predicted quantization parameter and the delta quantization parameter.

Another aspect of the present disclosure provides an apparatus for generating quantization parameters. The apparatus comprises an entropy decoder decoding prediction information on a current block and a delta quantization parameter from a bitstream. The apparatus also comprises a predicted quantization parameter calculator determining at least one pre-decoded reference region using the prediction information and calculating a predicted quantization parameter using quantization parameters corresponding to the at least one reference region. The apparatus also comprises an adder generating a quantization parameter for the current block by adding the predicted quantization parameter and the delta quantization parameter.

Another aspect of the present disclosure provides a method for generating a quantization parameter for a current block. The method is performed by a video encoding apparatus. The method comprises generating prediction information and a delta quantization parameter for the current block. The method also comprises determining at least one pre-decoded reference region using the prediction information. The method also comprises calculating a predicted quantization parameter using quantization parameters corresponding to the at least one reference region. The method also comprises generating the quantization parameter for the current block by adding the predicted quantization parameter and the delta quantization parameter.

As described above, an image encoding/decoding method according to the present embodiment provides a method and an apparatus for generating quantization parameters for generating a predicted quantization parameter for a quantization group using quantization parameters of a frame encoded/decoded previously in time. The method and the apparatus may achieve an effect of improving prediction performance for the quantization parameter.

DETAILED DESCRIPTION

Figure 1:
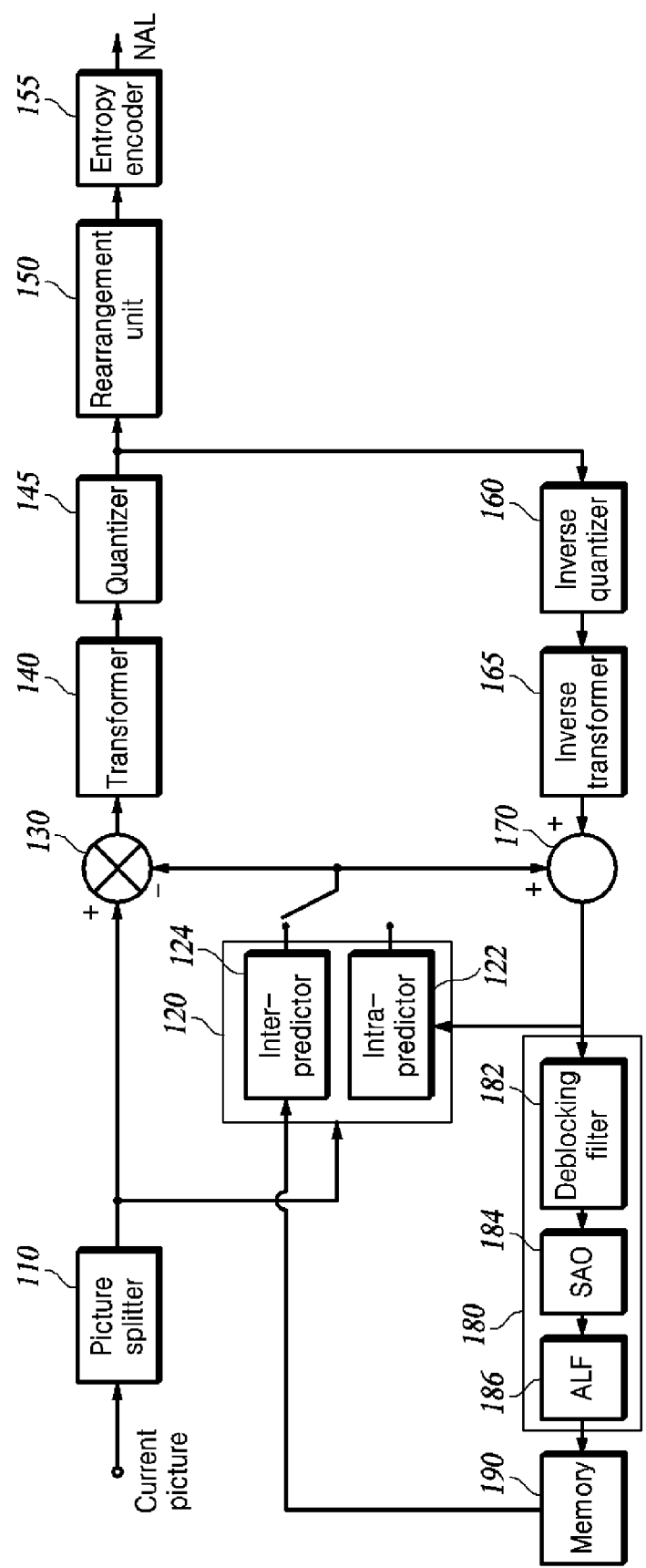
FIG. 1 is a block diagram of a video encoding apparatus that may implement the techniques of the present disclosure.

Hereinafter, embodiments of the present disclosure are described in detail with reference to drawings. When reference numerals refer to components of each drawing, it should be noted that although the same or equivalent components are illustrated in different drawings, the same or equivalent components may be denoted by the same reference numerals. Further, in describing the embodiments, a detailed description of known related configurations and functions may be omitted to avoid unnecessarily obscuring the subject matter of the embodiments.

FIG. 1 is a block diagram for a video encoding apparatus which may implement technologies of the present disclosure. Hereinafter, referring to illustration of FIG. 1, the video encoding apparatus and sub-components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop-filter unit 180, and a memory 190.

Each component of the encoding apparatus may be implemented as hardware or software or implemented as a combination of hardware and software. Further, a function of each component may be implemented as the software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information (CTU size) on the size of the CTU is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
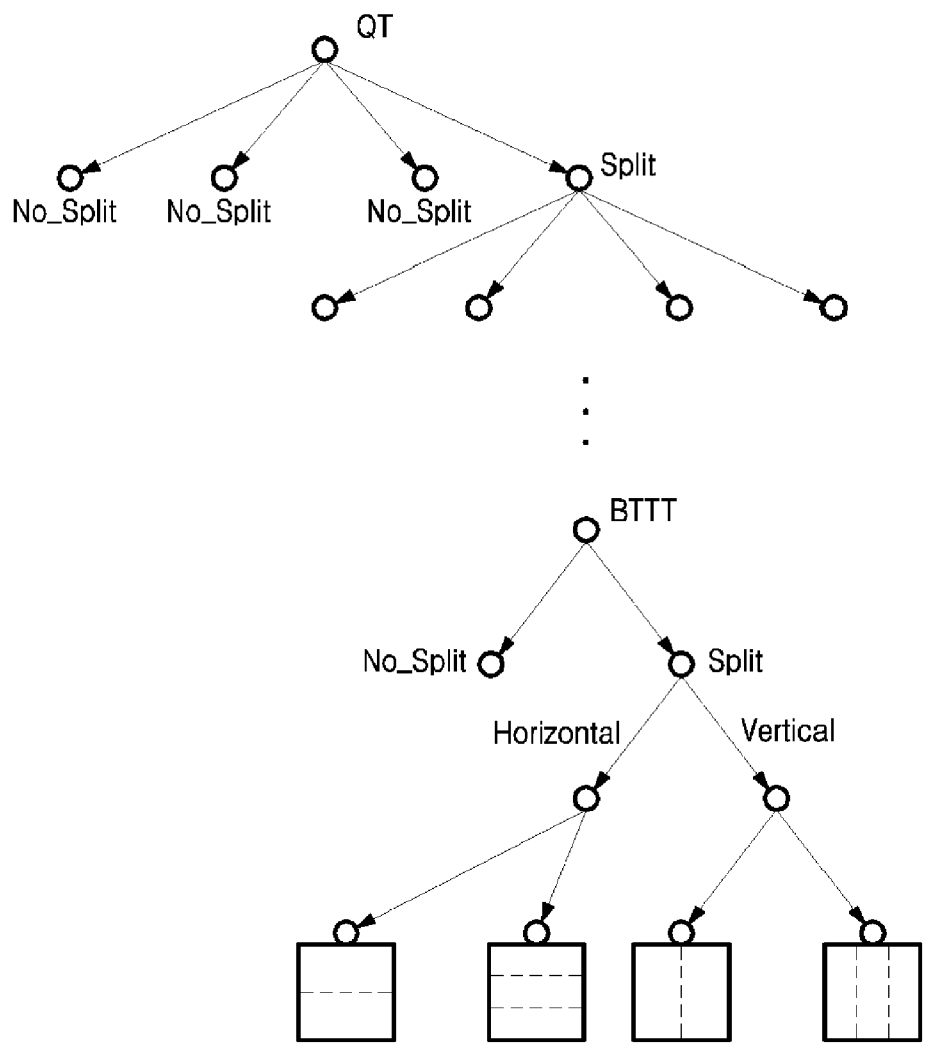
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., in a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the coding unit (CU), which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
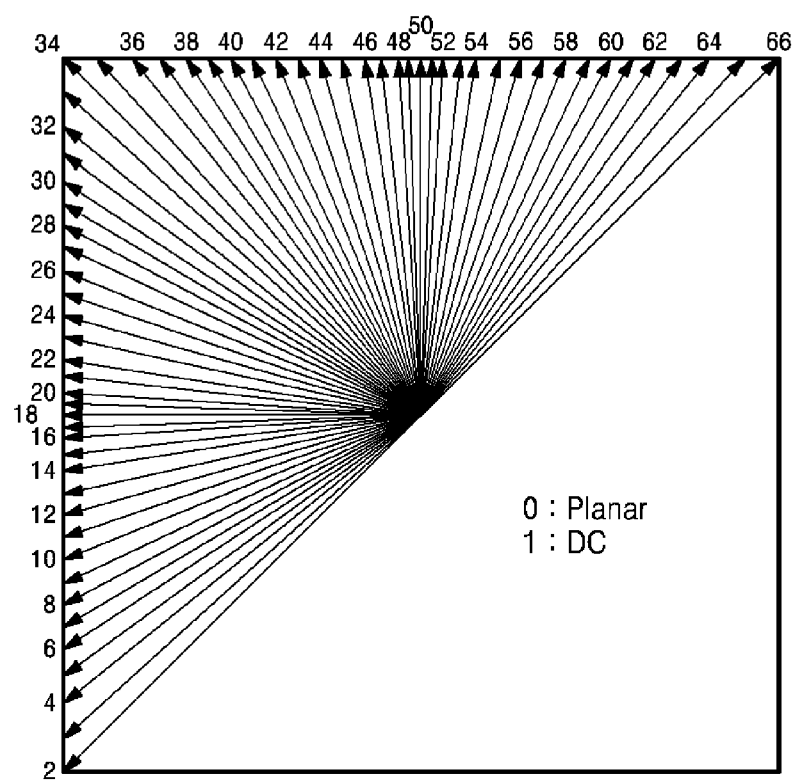
FIGS. 3A and 3B illustrate a plurality of intra prediction modes including wide-angle intra prediction modes.

The intra predictor 122 predicts pixels in the current block by using pixels (reference pixels) positioned on a neighboring of the current block in the current picture including the current block. There are a plurality of intra prediction modes according to the prediction direction. For example, as illustrated in FIG. 3A, the plurality of intra prediction modes may include 2 non-directional modes including a planar mode and a DC mode and may include 65 directional modes. A neighboring pixel and an arithmetic equation to be used are defined differently according to each prediction mode.

Figure 3B:
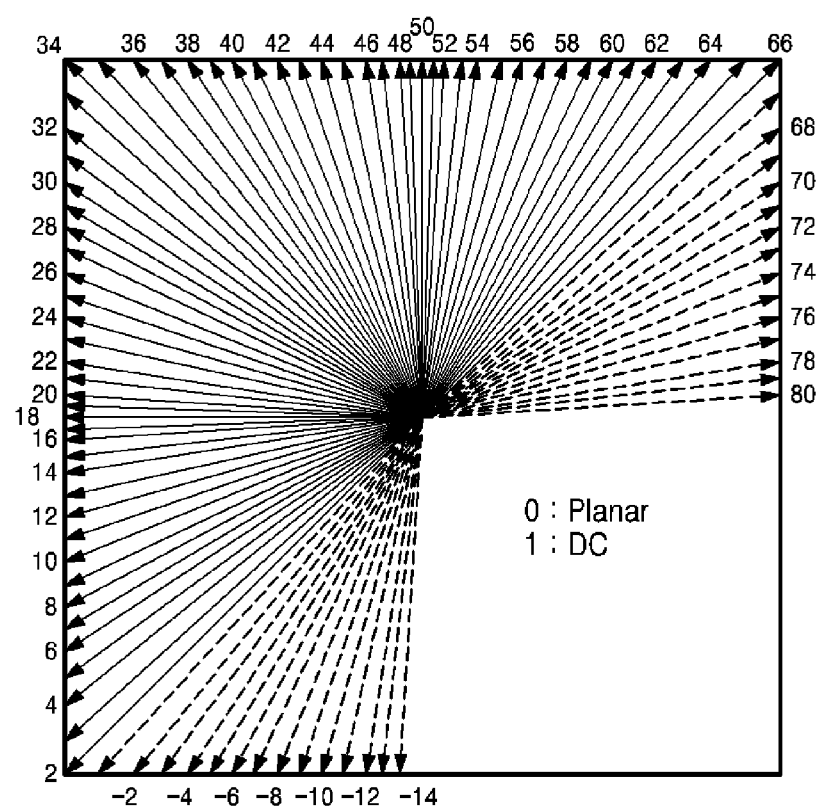

For efficient directional prediction for the current block having the rectangular shape, directional modes (#67 to #80, intra prediction modes #−1 to #−14) illustrated as dotted arrows in FIG. 3B may be additionally used. The direction modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
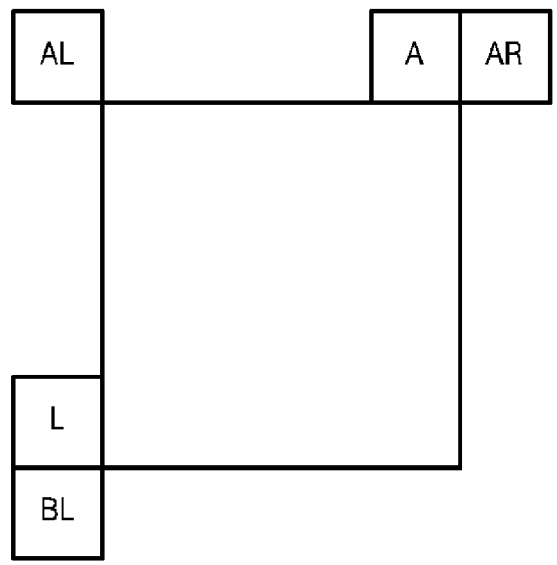
FIG. 4 illustrates neighboring blocks of a current block.

As a neighboring block for deriving the merge candidate, all or some of a left block L, a top block A, a top right block AR, a bottom left block BL, and a top left block AL adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting a residual signal. By using the merge skip mode, it is possible to achieve a relatively high encoding efficiency for images with slight motion, still images, screen content images, and the like.

Hereinafter, the merge mode and the merge skip mode are collectively called the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block L, a top block A, a top right block AR, a bottom left block BL, and a top left block AL adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms a residual signal in a residual block having pixel values of a spatial domain into a transform coefficient of a frequency domain. The transformer 140 may transform residual signals in the residual block by using a total size of the residual block as a transform unit or also split the residual block into a plurality of sub-blocks and perform the transform by using the sub-block as the transform unit. Alternatively, the residual block is divided into two sub-blocks, which are a transform area and a non-transform area to transform the residual signals by using only the transform area sub-block as the transform unit. Here, the transform area sub-block may be one of two rectangular blocks having a size ratio of 1:1 based on a horizontal axis (or vertical axis). In this case, a flag (cu_sbt_flag) indicates that only the sub-block is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area sub-block may have a size ratio of 1:3 based on the horizontal axis (or vertical axis), and in this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), Exponential Golomb, etc.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block are used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating a difference between the restored pixel and an original pixel, which occurs due to lossy coding. The SAO filter 184 applies an offset as a CTU unit to enhance a subjective image quality and encoding efficiency. Contrary to this, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
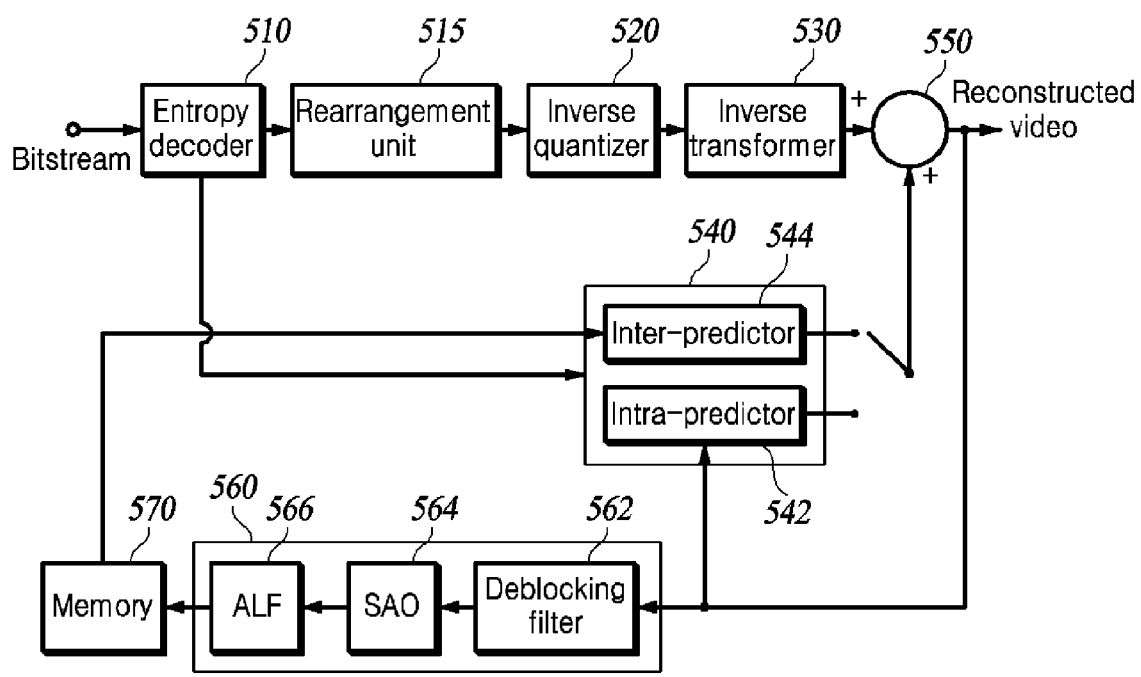
FIG. 5 is a block diagram of a video decoding apparatus that may implement the techniques of the present disclosure.

FIG. 5 is a functional block diagram for a video decoding apparatus, which may implement the technologies of the present disclosure. Hereinafter, referring to FIG. 5, the video decoding apparatus and sub-components of the apparatus are described.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similarly to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU is extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (MTT_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (sub-block) of the transform block, the inverse transformer 530 extracts a flag (cu_sbt_flag) that only the sub-block of the transform block is transformed, directional (vertical/horizontal) information (cu_sbt_horizontal_flag) of the sub-block, and/or positional information (cu_sbt_pos_flag) of the sub-block. The inverse transformer 530 also inversely transforms the transform coefficients of the corresponding sub-block into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transform unit output from the inverse transform unit and the prediction block output from the inter prediction unit or the intra prediction unit. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate a difference between the restored pixel and an original pixel, which occurs due to lossy coding. The filter coefficient of the ALF is determined by using information on a filter coefficient decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

As described above, the present embodiment relates to encoding and decoding of images (videos). More particularly, in a video encoding/decoding method, the present embodiment provides a method and an apparatus for generating quantization parameters, which generate a predicted quantization parameter for a quantization group using quantization parameters of a frame encoded/decoded previously in time. The method and the apparatus may improve prediction performance for the quantization parameter.

In the following description, the video encoding apparatus and method are used in parallel with the encoding apparatus and method, and the video decoding apparatus and method are used in parallel with the decoding apparatus and method.

The term "target block" may be used in the same meaning as a current block or a coding unit (CU) as described above or may mean a part of the CU.

Since the method and the apparatus for generating quantization parameters according to the present embodiment may be similarly applied to an encoding apparatus and a decoding apparatus, an embodiment applied to a decoding apparatus is mainly described below.

Figure 6:
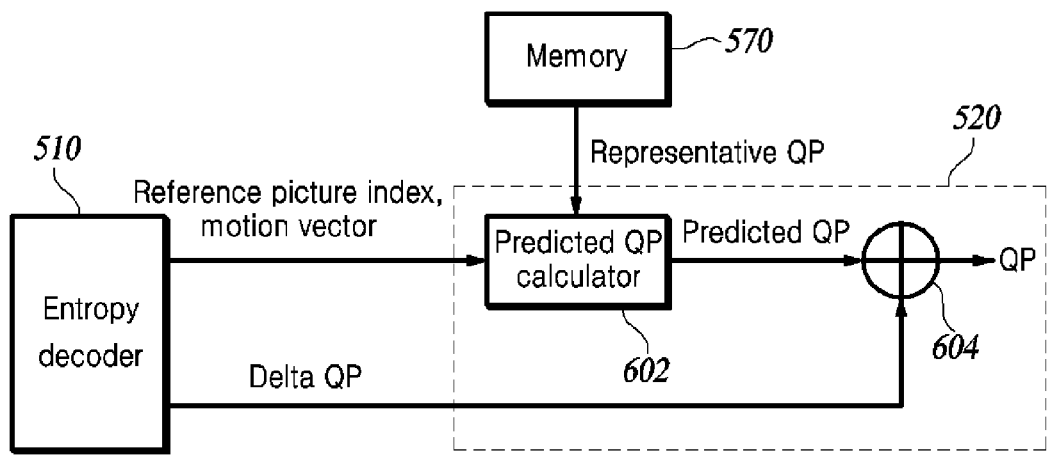
FIG. 6 is a conceptual diagram illustrating an apparatus for generating quantization parameters according to one embodiment of the present disclosure.

FIG. 6 is a conceptual diagram illustrating an apparatus for generating quantization parameters according to one embodiment of the present disclosure.

The apparatus for generating quantization parameters 600 (hereinafter, "QP generation apparatus") calculates a predicted quantization parameter (hereinafter, "predicted QP") in quantization group units and then generates a quantization parameter (QP) by adding the predicted QP and residual Quantization Parameter (hereinafter, "residual QP") of a current block. The QP generation apparatus 600 includes all or part of an entropy decoder 510, a memory 570, a predicted QP calculator 602, and an adder 604. Here, the predicted QP calculator 602 and the adder 604 correspond to a part of the inverse quantizer 520.

The entropy encoding unit 510 decodes, from a bitstream, a delta QP for the current block to decode.

The memory 570 includes a reconstruction picture buffer in which a reconstructed picture is stored and a QP map buffer in which a quantization parameter map (hereinafter, "QP map") is stored. Details of the QP map are described below. A stored reconstructed picture may be used as a reference picture, and a stored QP map may be used as a reference QP map.

The predicted QP calculator 602 may generate a predicted QP using the QPs of neighboring blocks of a quantization group. A method for generating predicted QPs is described below.

The adder 604 calculates the QP for the current block by adding the predicted QP and the delta QP.

Hereinafter, a method for generating quantization parameters for a current block to decode is described with reference to FIGS. 7-12.

Figure 7:
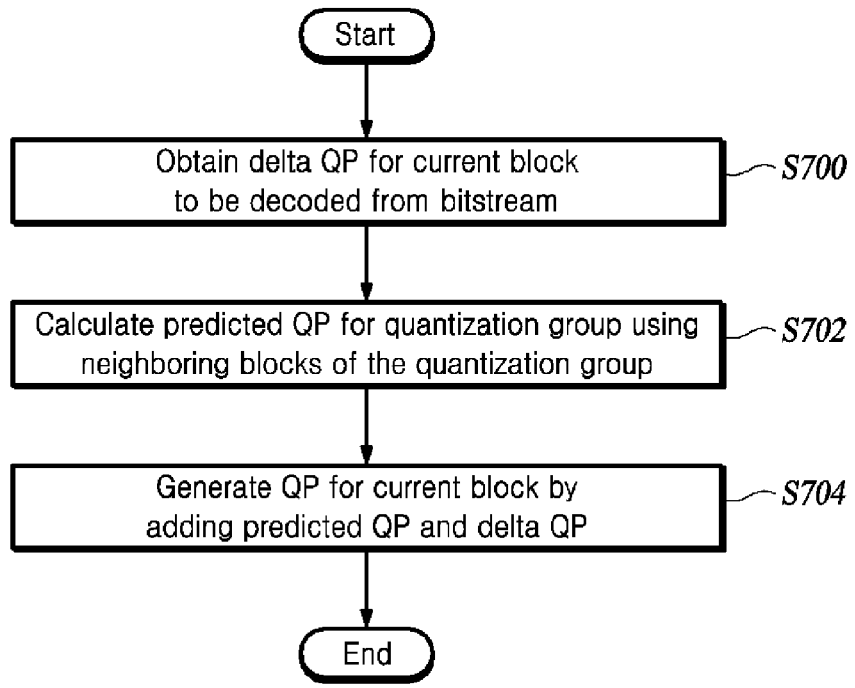
FIG. 7 is a flow diagram illustrating a method for generating quantization parameters according to one embodiment of the present disclosure.

FIG. 7 is a flow diagram illustrating a method for generating quantization parameters according to one embodiment of the present disclosure.

The QP generation apparatus 600 obtains, from a bitstream, a delta QP for a current block to decode S700.

Meanwhile, the quantization group may be a CTU, and the CTU may be a group of one or a plurality of CUs. The predicted QP may be calculated in units of quantization groups. When the current block is included in the quantization group, in other words, when a quantization group is a group of a plurality of CUs, one delta QP is decoded for a plurality of CUs. When the size of a current block is the same as the size of a quantization group (i.e., when the size of the current block is greater than or equal to the predefined minimum size of the quantization group, and quantization is performed in units of current blocks), the delta QP is decoded.

The QP generation apparatus 600 calculates a predicted QP for a quantization group using neighboring blocks of the quantization group S702.

Figures 8, 9:
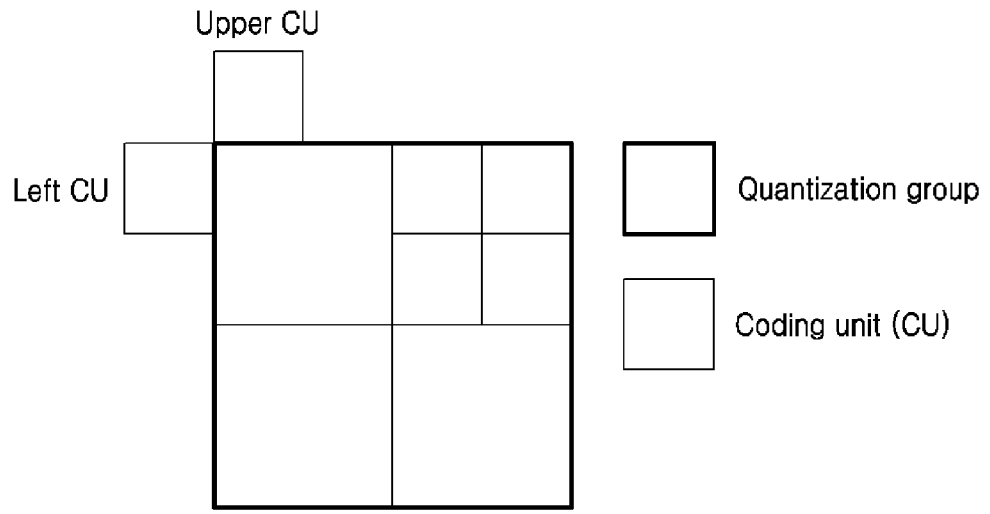
FIG. 8 illustrates neighboring blocks used for calculating a predicted quantization parameter (QP) for a quantization group according to one embodiment of the present disclosure.
FIG. 9 is a conceptual diagram for a QP map based on an N×M block according to one embodiment of the present disclosure.

The predicted QP calculator 602 of the QP generation apparatus 600 may generate a predicted QP as follows. When the quantization group is the first quantization group of a slice, the predicted QP calculator 602 uses the QP transmitted in units of slices as a predicted quantization parameter. If the quantization group is not the first quantization group of the slice, as illustrated in FIG. 8, the predicted QP calculator 602 may calculate the predicted QP using the QP of a CU including an upper or left pixel of the first pixel of the quantization group. The predicted QP calculator 602 calculates the predicted QP by using a weighted sum of available parameters among the upper CU's quantization parameters and the left CU's quantization parameters.

The QP generation apparatus 600 generates a QP for the current block by adding the predicted QP and the delta QP S704.

On the other hand, when a slice including a quantization group is an inter prediction-based slice, a predicted QP may be calculated by referring to the QP on a QP map based on one or a plurality of (an index of a reference picture, a motion vector) pairs for the first CU of the quantization group.

In one embodiment according to the present disclosure, the QP map may be a set of representative quantization parameters (hereinafter, "representative QP") stored in a QP map buffer. Representative QPs calculated in one picture may be stored in the memory 570 sequentially or in the form of a 2D array for each area of a frame.

Figure 10:
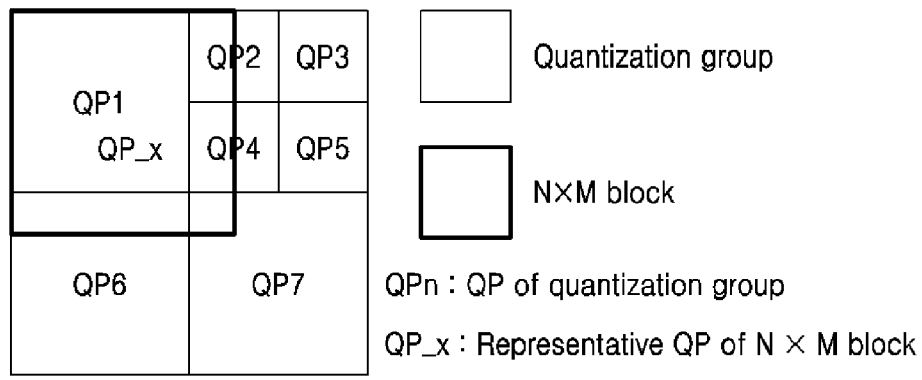
FIG. 10 illustrates a method for calculating a representative QP of a QP map based on an N×M block according to one embodiment of the present disclosure.

As illustrated in FIG. 9, the decoding apparatus may partition one picture into units of N×M blocks (where N is the number of pixels in the horizontal direction, and M is the number of pixels in the vertical direction) and then generate a QP map for the picture in which each N×M block has a representative QP. Also, as shown in FIG. 10, the decoding apparatus may calculate a representative QP for an N×M block using QPs of quantization groups, all or part of the region of which overlaps the N×M block. In other words, the decoding apparatus may calculate the representative QP by performing a weighted sum of the QPs of the quantization groups overlapping the N×M block. In this case, the weights used for the weighted sum may be calculated based on the size of an overlapping region between each quantization group and the N×M block.

The decoding apparatus may perform a management task, such as storing and deleting a QP map for each picture in the memory 570. In this case, a Picture Order Count (POC) for a reference picture corresponding to the QP map may be designated as an index of the QP map. The decoding apparatus may access the QP map in the memory 570 using an index of the QP map, the number of horizontal/vertical directions, or values of N and M. Here, the number in the horizontal/vertical direction represents the number of partitions of a picture in the horizontal/vertical direction when the picture is partitioned in units of N×M blocks. For example, in the example of FIG. 9, the number of partitions in the horizontal direction and the number in the vertical direction are equal to 4.

In another embodiment according to the present disclosure, an index of a reference picture corresponding to a QP map may be designated as an index of the QP map.

Meanwhile, the order in which a QP map is stored in the memory 570 may be the same as the order in which a reconstructed picture is stored in a reconstruction feature buffer. Alternatively, a QP map may be stored in the memory 570 at specific frame intervals. Alternatively, a QP map of a frame having a specific layer index may be stored in the memory 570.

The order in which a QP map is deleted from the memory 570 may be the same as the order in which pictures reconstructed from the reconstruction feature buffer are deleted. Alternatively, the QP map may be deleted from the memory 570 at a specific frame interval after n (where n is a natural number) frame delay.

Figure 11:
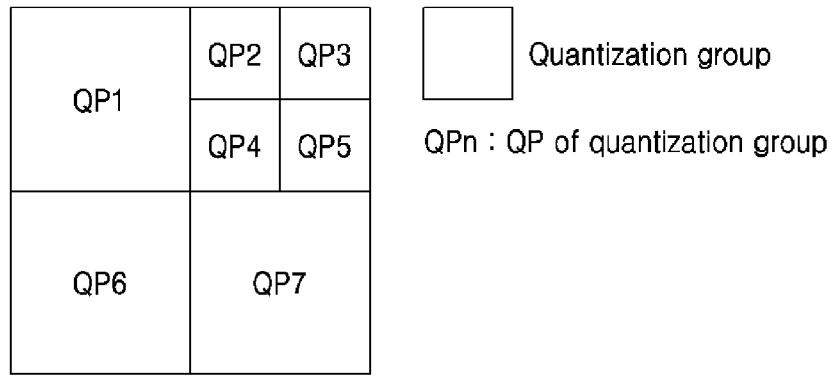
FIG. 11 is a conceptual diagram for a QP map based on a QP for each quantization group according to another embodiment of the present disclosure.

In another embodiment according to the present disclosure, as shown in FIG. 11, the QP map may be a set of QPs for each quantization group stored in a QP map buffer. The QPs calculated for one picture may be stored in the memory 570 for each region of the frame.

Hereinafter, as described above, the flow diagram illustrated in FIG. 12 may be applied when a slice including a quantization group is an inter prediction-based slice.

Figure 12:
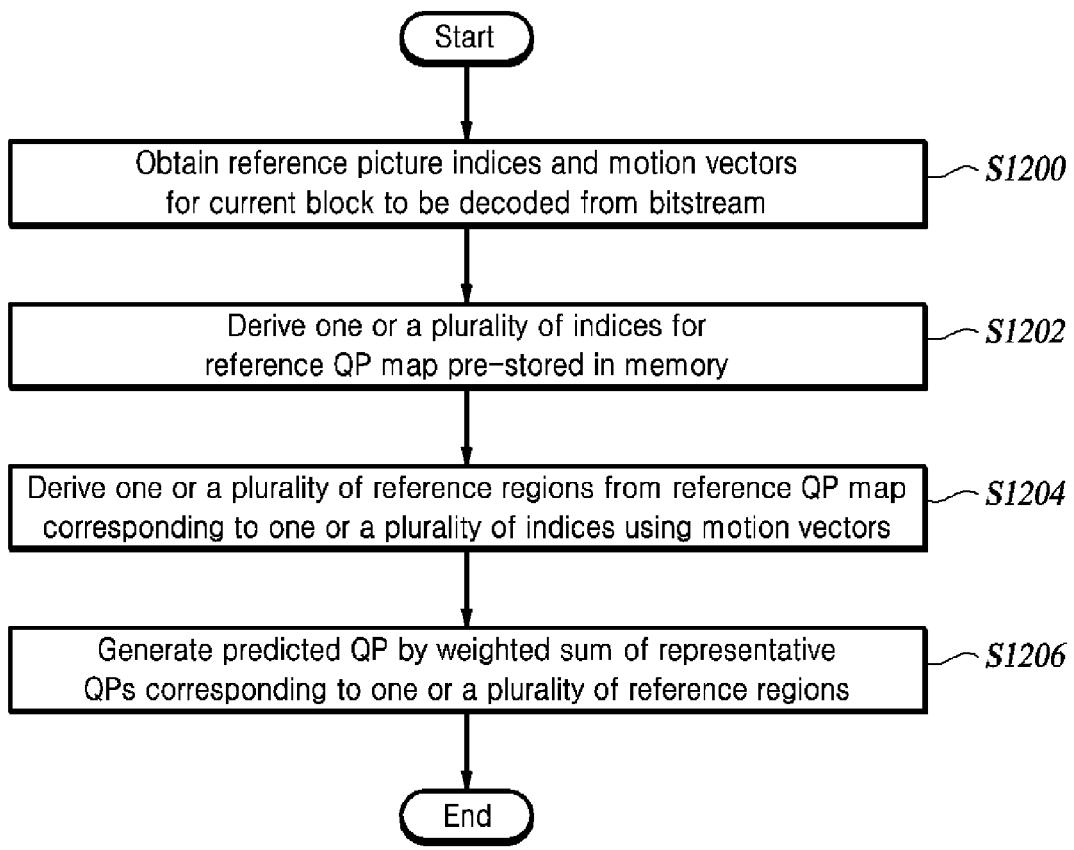
FIG. 12 is a flow diagram illustrating a method for calculating a predicted QP using a QP map based on an N×M block according to one embodiment of the present disclosure.

FIG. 12 is a flow diagram illustrating a method for calculating a predicted QP using a QP map based on an N×M block according to one embodiment of the present disclosure.

When a slice including a quantization group is an inter prediction-based slice, the QP generation apparatus 600 obtains a reference picture index and a motion vector for a current block to be decoded from a bitstream S1200.

The predicted QP calculator 602 of the QP generation apparatus 600 derives one or a plurality of indices for a pre-stored reference QP map using the reference picture index S1202.

If the current block has a plurality of reference picture indices, the predicted QP calculator 602 may derive one or a plurality of indices for a reference QP map stored in the QP map buffer in the memory using one or a plurality of reference picture indices.

The predicted QP calculator 602 may designate the POC of a reference picture designated by the reference picture index of the first coding unit of a quantization group as an index to the reference QP map.

If the reference QP map having the POC of the reference picture is not present on the QP map buffer, the predicted QP calculator 602 may use the following two methods to derive the index.

In the index derivation method 1, the predicted QP calculator 602 may use the index of the reference QP map having the closest value to the POC of the reference picture. Accordingly, when "current picture Picture Order Count (POC)<reference picture POC," the predicted QP calculator 602 may follow the condition that "current picture POC<reference QP map index"; when "current picture POC>reference picture POC," the predicted QP calculator 602 may follow the condition that "current picture POC>reference QP map index." Here, the current picture is a picture including a current block.

Figure 13:
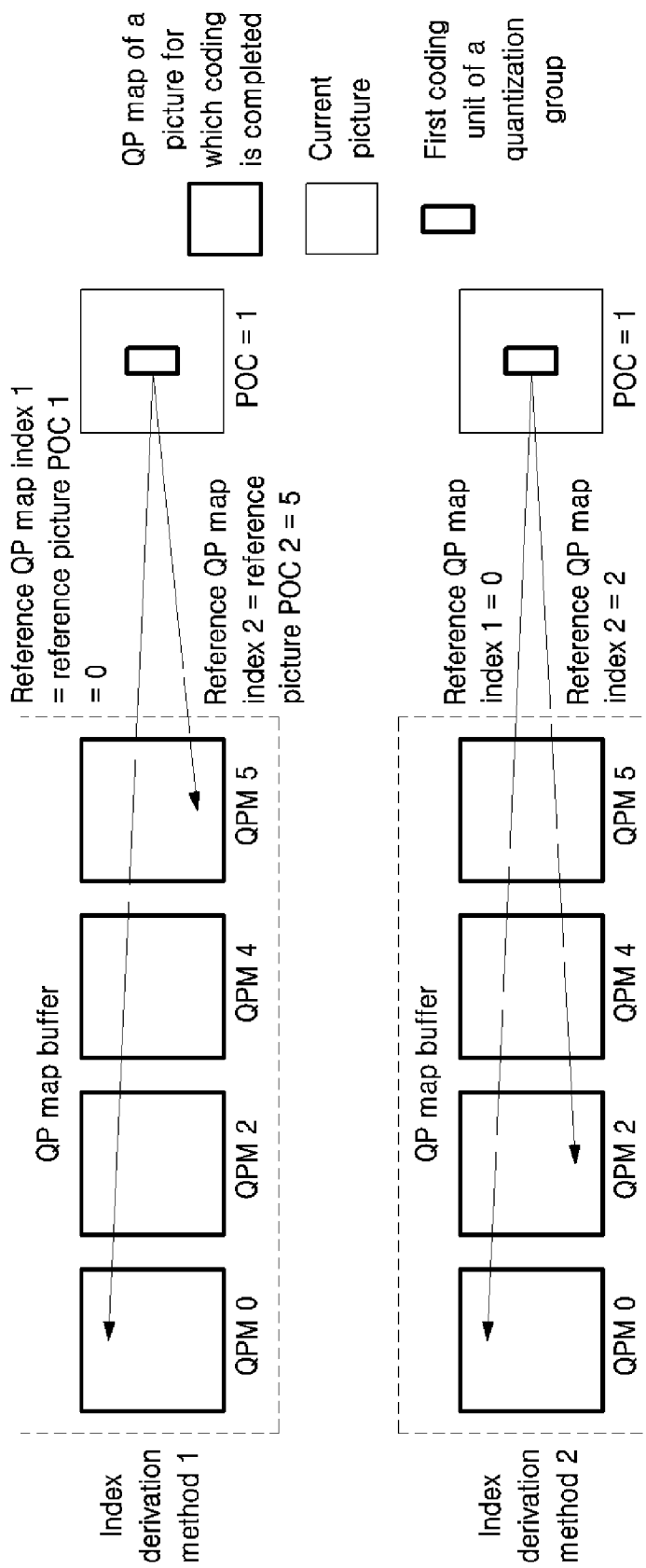
FIG. 13 illustrates derivation of indices for a reference QP map according to one embodiment of the present disclosure.

The index derivation method 1 of FIG. 13 illustrates an example in which, when the POC of the current picture is 1 and the POCs for two reference pictures are 0 and 5, the indices of a reference QP map on the QP map buffer are also designated as 0 and 5.

In the index derivation method 2, for the first coding unit of the quantization group, among reference QP maps stored in the QP map buffer, the predicted QP calculator 602 may designate the index satisfying a condition that "current picture POC<index≤reference picture POC" or "current picture POC>index≥reference picture POC" and exhibiting the smallest difference from the current picture POC as an index for the reference QP map.

The index derivation method 2 of FIG. 13 illustrates an example in which, when the POC of the current picture is 1, the indices of the reference QP map on the QP map buffer are designated as 0 and 2 so that a difference from the current picture POC is the smallest.

The predicted QP calculator 602 derives one or a plurality of reference regions from a reference QP map corresponding to one or a plurality of indices using motion vectors S1204. In this case, a motion vector paired with one or a plurality of reference pictures, which is used in the step of deriving an index for a reference QP map, may be used to designate a reference region. As described above, one or a plurality of reference regions represent one of N×M blocks included in the reference QP map.

Figure 14:
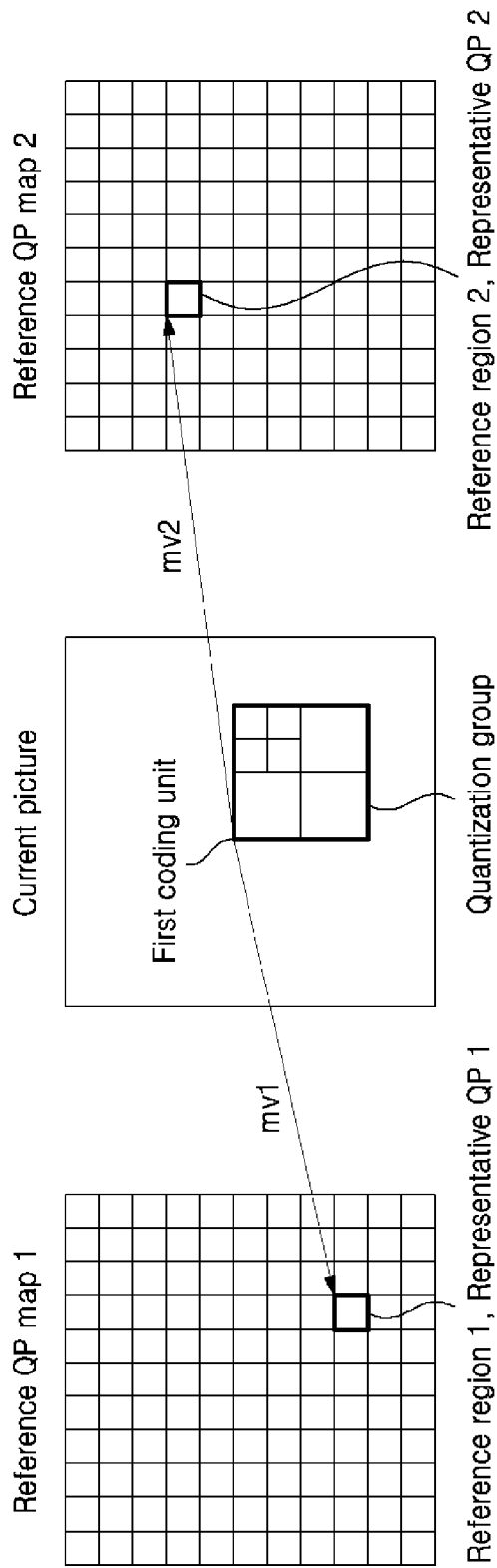
FIG. 14 illustrates derivation of a reference region from a reference QP according to one embodiment of the present disclosure.

FIG. 14 shows an example in which the predicted QP calculator 602 derives two reference regions from reference QP map 1 and reference QP map 2 using two motion vectors mv1 and mv2.

Meanwhile, when the reference picture POC for the current block and the index for the reference QP map are different, the predicted QP calculator 602 may generate a scaled motion vector ($mvX_{scaled}$, $mvY_{scaled}$) by applying scaling to the motion vector (mvX, mvY), as shown in Eq. 1.

$$mvX_{scaled} = mvX \times (POC_{predPic} - POC_{currPic}) / (IDX_{predQPmap} - POC_{currPic})$$

$$mvX_{scaled} = mvY \times (POC_{predPic} - POC_{currPic}) / (IDX_{predQPmap} - POC_{currPic})$$ [Eq. 1]

In Eq. 1, $POC_{currPic}$ is the POC of a current picture, $POC_{PredPic}$ is the POC of a reference picture, and $IDX_{predQPmap}$ represents the index to a reference QP map.

The predicted QP calculator 602 generates a predicted QP by a weighted sum of representative QPs corresponding to one or a plurality of reference regions S1206. Here, weights may be calculated based on a difference between the index for a reference QP map including the representative QP and the POC of a current picture.

Although the method and apparatus for generating quantization parameters above have been described mainly for an embodiment applied to a decoding apparatus, the descriptions may be similarly applied to an encoding apparatus. However, the encoding apparatus may generate a difference QP, a reference picture index, and a motion vector for the current block to be encoded during the encoding process. After that, the process of calculating a predicted OP using the generated data is the same as the method for generating quantization parameters performed in the decoding apparatus.

Meanwhile, in another embodiment according to the present disclosure, as illustrated in FIG. 11, when the QP map is a set of QPs for each quantization group, the process of generating a predicted QP (S1202 to S1206) may be changed as follows.

The predicted QP calculator 602 of the QP generation apparatus 600 derives one or a plurality of indices for a pre-stored reference QP map using the reference picture index.

The predicted QP calculator 602, for the first coding unit of the quantization group, may derive one or a plurality of indices for the reference QP map using the index derivation method 1 or index derivation method 2 as described above.

The predicted QP calculator 602 derives one or a plurality of reference regions from a reference QP map corresponding to one or a plurality of indices using motion vectors. At this time, a motion vector paired with one or a plurality of reference pictures used in the step of deriving an index for a reference QP map may be used.

Figure 15:
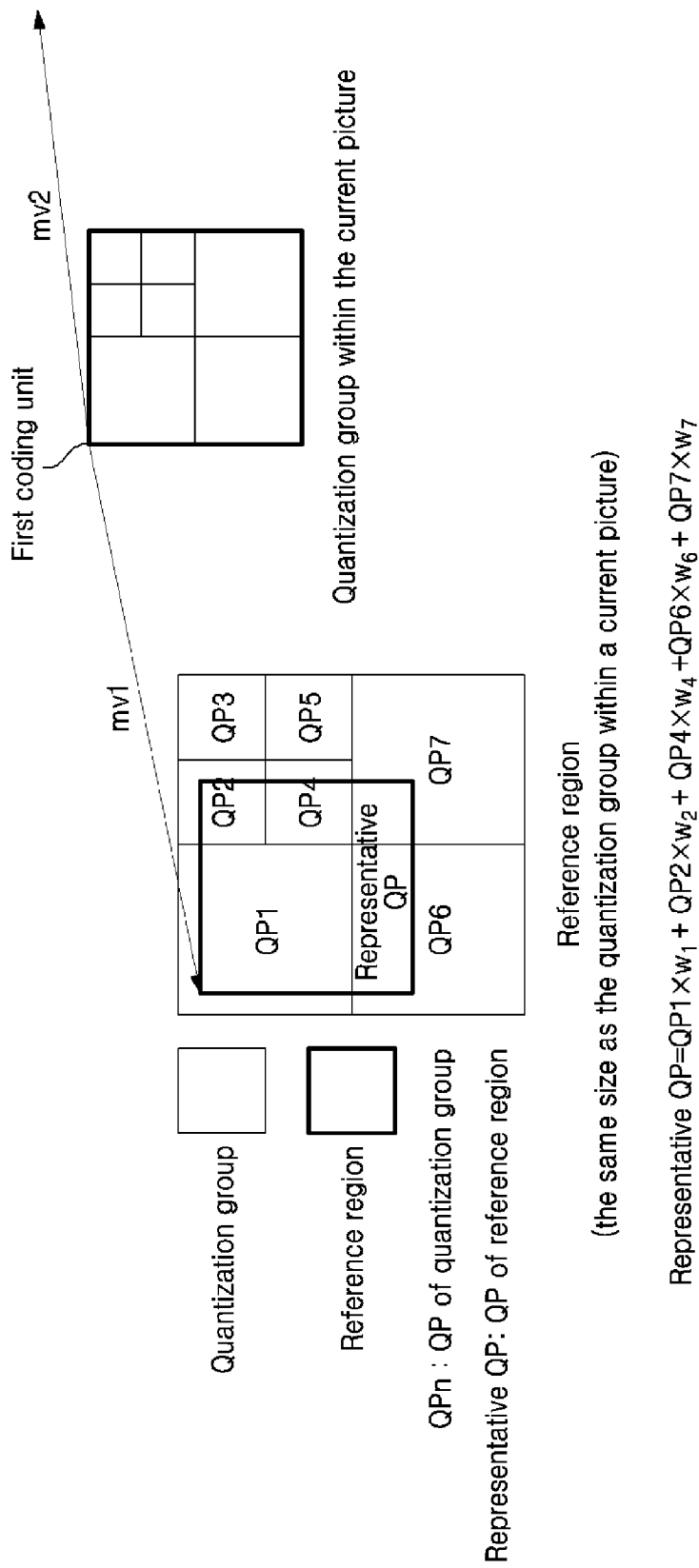
FIG. 15 illustrates a method for calculating a representative QP of a QP map based on QPs for each quantization group according to another embodiment of the present disclosure.

As illustrated in FIG. 15, one or a plurality of reference regions may use the upper left corner as the point designated by a motion vector and have the same size as a quantization group in the current picture. For such a reference region, the predicted QP calculator 602 may calculate a representative QP by performing a weighted sum of QPs of a quantization group in which all or part of the region overlaps the reference region. In this case, the weights used for the weighted sum may be calculated based on the size of an overlapping region between each quantization group and the reference region. FIG. 15 shows an example in which the predicted QP calculator 602 calculates a representative QP using a reference region based on the motion vector mv1 and QPs of a quantization group overlapping the reference region.

The predicted QP calculator 602 generates a predicted QP by applying a weighted sum of representative QPs corresponding to one or a plurality of reference regions. Here, weights may be calculated based on a difference between the index for a reference QP map including the representative QP and the POC of a current picture.

The difference between the two methods illustrated in FIGS. 10 and 15 may be described as follows.

In the case of FIG. 10, the QP generation apparatus 600 generates a QP map including a representative QP for an N×M block, stores the generated QP map in a buffer, and then uses the QP map as a reference QP map. In this case, the representative QP may be calculated by applying a weighted sum of the QPs of the quantization group overlapping with the N×M block. A QP map based on a representative QP requires a generation step but may reduce the required storage space and simplify access to the QP map.

In the case of FIG. 15, the QP generation apparatus 600 stores a QP map including the QPs of a quantization group into a buffer without a modification and uses the QP map as a reference QP map. Afterward, the representative QP may be calculated by applying a weighted sum of the QPs on the reference QP map overlapping with the reference region having the same size as the quantization group. A QP map based on a quantization group does not require a pre-generation step but requires increased storage space and complicated access to the QP map.

Meanwhile, intra block copy (IBC) is an encoding/decoding method used in Screen Content Coding (SCC). The encoding apparatus searches for a block vector (BV) to predict a current block by performing blocking matching (BM). BV is a vector designating a reference block for a current block, where the reference block is included in a reconstructed region of the current picture. The decoding apparatus may predict the current block by generating a reference block using the BV.

In another embodiment according to the present disclosure, when the IBC mode is applied, the encoding/decoding apparatus may generate a predicted QP for a quantization group using QPs of a reference block designated by the BV.

In each flowchart according to the embodiment, it is described that respective processes are executed in sequence, but the present disclosure is not limited thereto. In other words, since it is applicable that the processes described in the flowchart are changed and executed or one or more processes are executed in parallel, the flowchart is not limited to a time series order.

Meanwhile, various functions or methods described in the present disclosure may also be implemented by instructions stored in a non-transitory recording medium, which may be read and executed by one or more processors. The non-transitory recording medium includes, for example, all types of recording devices storing data in a form readable by a computer system. For example, the non-transitory recording medium includes storage media such as an erasable programmable read only memory (EPROM), a flash drive, an optical driver, a magnetic hard drive, and a solid state drive (SSD).

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, one of ordinary skill should understand the scope of the present disclosure is not to be limited by the above explicitly described embodiments but by the claims and equivalents thereof.

REFERENCE NUMERALS

124: inter predictor
165: inverse transformer
190: memory
510: entropy decoder
570: memory
600: apparatus for generating quantization parameters
602: predicted quantization parameter calculator
604: adder

What is claimed is:

1. A method for generating a quantization parameter for a current block included in a current picture, performed by a video decoding apparatus, the method comprising:
decoding prediction information on the current block and a delta quantization parameter from a bitstream;
determining at least one pre-decoded reference region using the prediction information;
calculating a predicted quantization parameter using quantization parameters corresponding to the at least one reference region; and
generating the quantization parameter for the current block by adding the predicted quantization parameter and the delta quantization parameter,
wherein the prediction information includes indices and motion vectors of reference pictures of the current block,
wherein determining the at least one pre-decoded reference region includes:
deriving at least one index for reference quantization parameter maps using the indices of the reference pictures; and
deriving the at least one reference region from the reference quantization parameter maps corresponding to the at least one index using the motion vectors.

2. The method of claim 1,
wherein each of the reference quantization parameter maps is generated from different, pre-decoded reference pictures, and
wherein each of the reference quantization parameter maps is a two-dimensional array composed of quantization parameters generated in units of regions in a corresponding reference picture based on quantization parameters applied to the blocks within the reference picture.

3. The method of claim 2, wherein, for a picture partitioned into N×M blocks, where N is the number of pixels in the horizontal direction, and M is the number of pixels in the vertical direction, each of the reference quantization parameter maps has a quantization parameter calculated for each of the N×M blocks.

4. The method of claim 3, wherein the reference region, which corresponds to one of N×M blocks included in the reference quantization parameter map corresponding to the at least one index, is designated by the motion vector.

5. The method of claim 3, wherein a quantization parameter corresponding to the N×M block is generated by a weighted sum of quantization parameters of blocks based on first weights, at least part of the blocks overlapping with an N×M region co-located with the N×M block within a reference picture corresponding to a reference quantization parameter map including the N×M block.

6. The method of claim 5, wherein the first weights are calculated based on the size of an overlapping region between the blocks and the N×M size region.

7. The method of claim 2, wherein the deriving the index designates the Picture Order Count (POC) of a reference picture designated by a reference picture index as an index for the reference quantization parameter map.

8. The method of claim 7, wherein, when a reference quantization parameter map having the same index as the POC of the reference picture is not pre-stored, the deriving the index designates the index closest to the POC of the reference picture as an index for the reference quantization parameter map.

9. The method of claim 7, wherein, when a reference quantization parameter map having the same index as the POC of the reference picture is not pre-stored, the deriving the index designates the index closest to the POC of the reference picture as an index for the reference quantization parameter map, and
wherein the designated index is greater than the current picture's POC and smaller than or equal to the reference picture's POC, or the designated index is greater than or equal to the reference picture's POC and smaller than the current picture's POC.

10. The method of claim 8, wherein, when the reference picture's POC is different from the index for the reference quantization parameter map, the deriving the index scales the motion vector using the current picture's POC and the reference picture's POC.

11. The method of claim 2, wherein the calculating the predicted quantization parameter calculates the predicted quantization parameter by a weighted sum of quantization parameters for the at least one reference region based on second weights.

12. The method of claim 11, wherein the second weights are calculated based on a difference between the index for the reference quantization parameter map and the current picture's POC.

13. A method for generating a quantization parameter for a current block, performed by a video encoding apparatus, the method comprising:
generating prediction information and a quantization parameter for the current block;
determining at least one pre-decoded reference region using the prediction information;
calculating a predicted quantization parameter using quantization parameters corresponding to the at least one reference region;
generating a delta quantization parameter for the current block by subtracting the predicted quantization parameter from the quantization parameter; and
encoding the prediction information and the delta quantization parameter;
wherein the prediction information includes indices and motion vectors of reference pictures of the current block,
wherein determining the at least one pre-decoded reference region includes:
deriving at least one index for a pre-stored reference quantization parameter map using the indices of the reference pictures; and
deriving the at least one reference region from the reference quantization parameter maps corresponding to the at least one index using the motion vectors.

14. The method of claim 13,
wherein each of the reference quantization parameter maps is generated from different, pre-decoded reference pictures, and
wherein each of the reference quantization parameter maps is a two-dimensional array composed of quantization parameters generated in units of regions in a corresponding reference picture based on quantization parameters applied to the blocks within the reference picture.

15. A method for providing video data to a video decoding device, a method comprising:
encoding the video data into a bitstream; and
transmitting the bitstream to the video decoding device,
wherein encoding the video data comprises:
generating prediction information and a quantization parameter for a current block;
determining at least one pre-decoded reference region using the prediction information;
calculating a predicted quantization parameter using quantization parameters corresponding to the at least one reference region;
generating a delta quantization parameter for the current block by subtracting the predicted quantization parameter from the quantization parameter; and
encoding the prediction information and the delta quantization parameter;
wherein the prediction information includes indices and motion vectors of reference pictures of the current block,
wherein determining the at least one pre-decoded reference region includes:
deriving at least one index for a pre-stored reference quantization parameter map using the indices of the reference pictures; and
deriving the at least one reference region from the reference quantization parameter maps corresponding to the at least one index using the motion vectors.

16. The method of claim 15, wherein each of the reference quantization parameter maps is generated from different, pre-decoded reference pictures, and
wherein each of the reference quantization parameter maps is a two-dimensional array composed of quantization parameters generated in units of regions in a corresponding reference picture based on quantization parameters applied to the blocks within the reference picture.

* * * * *